US011876811B2

(12) United States Patent
Ito et al.

(10) Patent No.: US 11,876,811 B2
(45) Date of Patent: Jan. 16, 2024

(54) DETECTION METHOD, DETECTION SYSTEM, AND DETECTION PROGRAM

(71) Applicant: NIPPON TELEGRAPH AND TELEPHONE CORPORATION, Tokyo (JP)

(72) Inventors: Manami Ito, Musashino (JP); Kenichiro Muto, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 364 days.

(21) Appl. No.: 17/429,945

(22) PCT Filed: Jan. 27, 2020

(86) PCT No.: PCT/JP2020/002838
§ 371 (c)(1),
(2) Date: Aug. 11, 2021

(87) PCT Pub. No.: WO2020/166315
PCT Pub. Date: Aug. 20, 2020

(65) Prior Publication Data
US 2022/0217159 A1 Jul. 7, 2022

(30) Foreign Application Priority Data
Feb. 13, 2019 (JP) .................................. 2019-023962

(51) Int. Cl.
*H04L 9/40* (2022.01)

(52) U.S. Cl.
CPC ................................ *H04L 63/1416* (2013.01)

(58) Field of Classification Search
CPC ............ H04L 63/1416; H04W 12/009; H04W 12/121; G06F 21/55
See application file for complete search history.

(56) References Cited

U.S. PATENT DOCUMENTS

2005/0151500 A1    7/2005   Akiyama

FOREIGN PATENT DOCUMENTS

JP    2005-204392 A    7/2005

OTHER PUBLICATIONS

Mo et al., "Detecting Integrity Attacks on SCADA Systems", IEEE Transactions on Control System Technology, vol. 22, No. 4, Jul. 2014, pp. 1396-1407.
Sánchez et al., "Detection of Replay Attacks in Cyber-Physical Systems Using a Frequency-based Signature", Journal of the Franklin Institute, vol. 356, No. 5, 2019, pp. 2798-2824.

*Primary Examiner* — Brian F Shaw
(74) *Attorney, Agent, or Firm* — XSENSUS LLP

(57) ABSTRACT

Using sensor data indicating a state of a control target (2) outputted from a sensor (3) and a control input to control the state of the control target (2), a state estimation unit (4a) of a controller (4) calculates an estimate of the state of the control target (2). Further, a calculation unit (4b) of the controller (4) calculates the control input to which colored noise in a predetermined frequency band is added, according to the calculated estimate of the state of the control target (2).

7 Claims, 7 Drawing Sheets ures is a detection method executed in a detection system comprising a sensor and a controller, the detection method including: a state estimation process of the controller calculating, using sensor data indicating a state of a control target outputted from the sensor and a control input to control the state of the control target, an estimate of the state of the control target; and a calculation process of the controller calculating the control input to which colored noise in a predetermined frequency band is added, according to the calculated estimate of the state of the control target.

DETECTION METHOD, DETECTION SYSTEM, AND DETECTION PROGRAM

CROSS-REFERENCE TO RELATED APPLICATIONS

The present application is based on PCT filing PCT/JP2020/002838, filed Jan. 27, 2020, which claims priority to JP 2019-023962, filed Feb. 13, 2019, the entire contents of each are incorporated herein by reference.

TECHNICAL FIELD

The present invention relates to a detection method, a detection system and a detection program.

BACKGROUND ART

Recently, cases where a network is used for a control system that performs feedback control based on sensor data have been increasing. Along with the increase, the risk of cyber attacks is increasing. Especially, a replay attack that performs tampering with use of past sensor data to pretend that an operation is being normally performed is difficult to detect, and measures are required.

Therefore, in order to detect the replay attack, technology called watermark is proposed in which micro white noise is added to a control input to monitor a response of sensor data (see Non-Patent Literature 1).

CITATION LIST

Non-Patent Literature

Non-Patent Literature 1: Yilin Mo, Rohan Chabukswar, Bruno Sinopoli, "Detecting Integrity Attacks on SCADA Systems", IEEE Transactions on Control System Technology, Volume 22, Issue 4, July 2014, P. 1396-1407

SUMMARY OF THE INVENTION

Technical Problem

According to the conventional technology, however, there is a possibility that parameter identification of a control system by an attacker becomes highly accurately possible. In other words, when white noise is added to a control input, the control input may have variation that is large enough to satisfy identifiability conditions of an algorithm, thereby allowing an attacker to identify parameters with significantly higher accuracy.

When parameters of a control system are identified by an attacker, a confidentiality problem that design information about the control system leaks occurs. Further, there is a possibility that the attacker accurately calculates an estimate of sensor data using the identified control system and performs tampering to pretend that an operation is being normally performed, at a higher level than a replay attack, and detection becomes further difficult.

The present invention has been made in view of the above description, and an object is to make parameter identification of a control system by an attacker difficult and detect a replay attack.

Means for Solving the Problem

In order to solve the problem described above and achieve the object, a detection method according to the present invention is a detection method executed in a detection system comprising a sensor and a controller, the detection method including: a state estimation process of the controller calculating, using sensor data indicating a state of a control target outputted from the sensor and a control input to control the state of the control target, an estimate of the state of the control target; and a calculation process of the controller calculating the control input to which colored noise in a predetermined frequency band is added, according to the calculated estimate of the state of the control target.

Effects of the Invention

According to the present invention, it becomes possible to make parameter identification of a control system by an attacker difficult and detect a replay attack.

DESCRIPTION OF EMBODIMENTS

Figure 1:
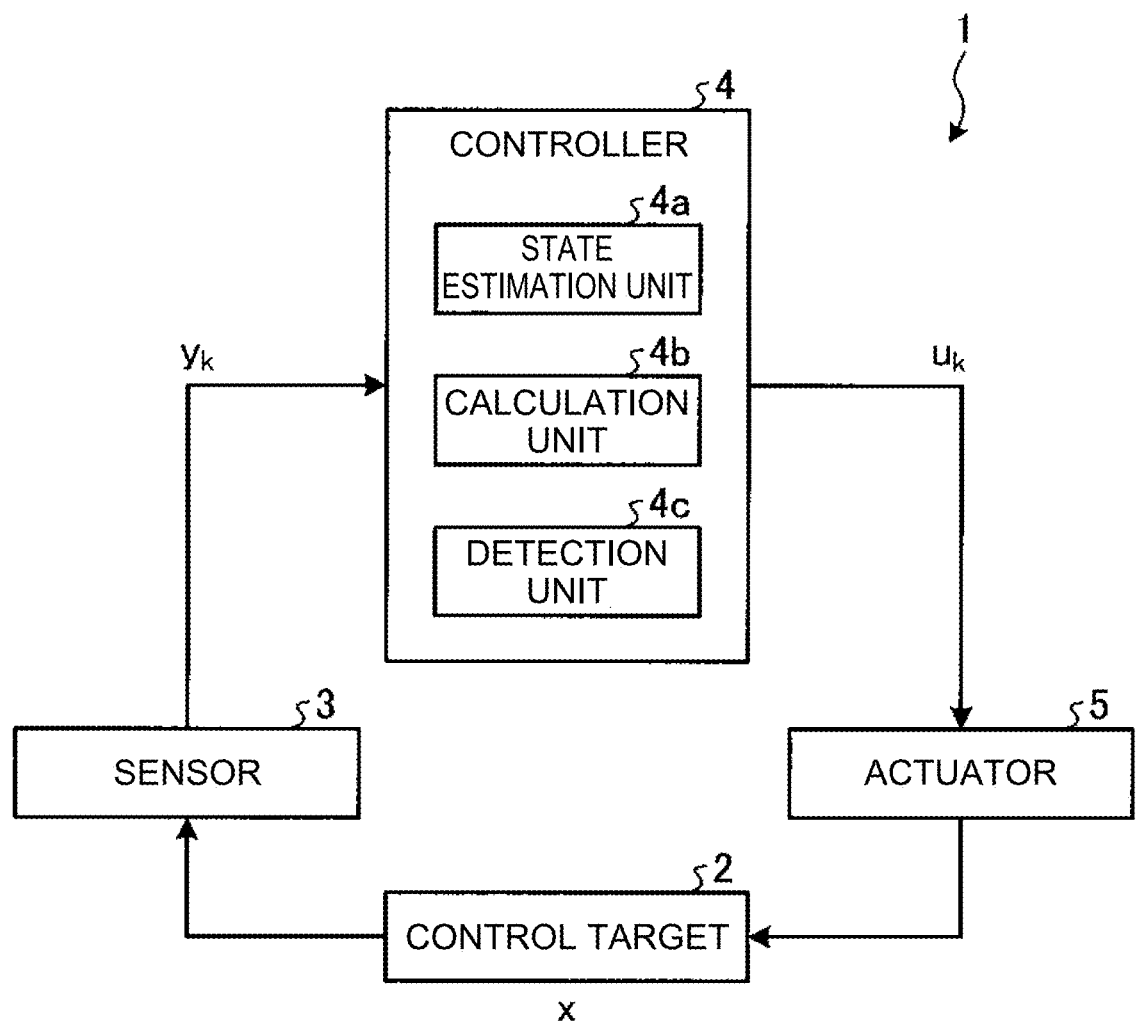
FIG. 1 is a schematic diagram showing an overview configuration of a detection system according to the present embodiment.

An embodiment of the present invention will be described below in detail with reference to drawings. Note that the present invention is not limited by this embodiment. In the drawings, the same portions are shown being given the same reference sign.

[Configuration of Detection System]

FIG. 1 is a schematic diagram showing an outline configuration of a detection system according to the present embodiment. A detection system 1 is a control system that performs feedback control of a state of a control target 2, for example, a heat engine or the like according to a current state. As illustrated in FIG. 1, the detection system 1 has the control target 2, a sensor 3, a controller 4 and an actuator 5.

The sensor 3 is a sensor, such as a temperature sensor, to measure the state of the control target 2, and outputs sensor data obtained by sensing physical information indicate the state of the control target 2, to the controller 4 via a network. The sensor 3 is realized, for example, by an MPU (micro processing unit), an FPGA (field programmable gate array) or the like.

The controller 4 calculates a control input to control, for example, the actuator 5 for the control target 2, such as a valve, using the sensor data received from the sensor 3. In the present embodiment, the controller 4 calculates a control input to which colored noise in a predetermined frequency band is added, according to an estimate of the state of the control target 2 calculated using the sensor data indicating the state of the control target 2, which has been outputted from the sensor 3, and the control input to control the state of the control target 2.

Specifically, the controller 4 is realized by a general-purpose computer, for example, a personal computer or the like, and a control unit such as a CPU (central processing unit) executes a processing program stored in a memory. Thereby, the control unit functions as a state estimation unit 4a, a calculation unit 4b and a detection unit 4c as shown in FIG. 1. Each of or a part of these functional units may be implemented in different hardware. For example, the detection unit 4c may be implemented in a device different from the controller 4.

Further, in the controller 4, a communication control unit not shown, which is realized by an NIC (network interface card), controls communication between the control unit and external devices such as the control target 2 and the sensor 3 via the network. The controller 4 is provided with a storage unit not shown, which is realized by a semiconductor memory device, such as a RAM and a flash memory, or a storage device such as a hard disk and an optical disk.

Here, a state x(k) (hereinafter also referred to as $x_k$) of the control target 2 at discrete time k is indicated with the following expression (1). Here, (k+1) means time one step after K; and w(k) represents modeled noise.

[Math. 1]

$$x(k+1) = Ax(k) + \underbrace{Bu(k)}_{\text{CONTROL INPUT}} + \underbrace{w(k)}_{\text{MODELED NOISE}} \quad (1)$$

In this case, sensor data y(k) (hereinafter also referred to as $y_k$) outputted by the sensor 3 is indicated by the following expression (2). Here, v(k) represents environmental noise.

[Math. 2]

$$y(k) = Cx(k) + \underbrace{v(k)}_{\text{ENVIRONMENTAL NOISE}} \quad (2)$$

The state estimation unit 4a calculates an estimate of the state of the control target 2 using sensor data indicating the state of the control target 2 and a control input to control the state of the control target 2. Specifically, the state estimation unit 4a calculates the estimate of the state of the control target 2 using a Kalman filter as shown by the following expression (3).

[Math. 3]

$$\hat{x}(k+1) = A\hat{x}(k) + Bu(k) - \underbrace{K(C\hat{x}(k+1) - y(k+1))}_{\text{KALMAN FILTER}} \quad (3)$$

The calculation unit 4b calculates a control input to which colored noise in a predetermined frequency band is added, according to the calculated estimate of the state of the control target 2. Specifically, the calculation unit 4b calculates a control input to perform optimal control in order to steady variation of the sensor data y(k) that includes the environmental noise v(k), shown in the above expression (2). Further, the calculation unit 4b adds colored noise with a frequency co within a predetermined range, to the control input to perform the optimal control indicated by a dotted line in the following expression (4).

[Math. 4]

$$u_k = \underbrace{L\hat{x}_k}_{\text{OPTIMAL CONTROL}} + \underbrace{\sum_{n=1} \alpha_n \sin(2\pi\omega_n k + \theta_n)}_{\text{COLORED NOISE}} \quad (4)$$

Figure 2:
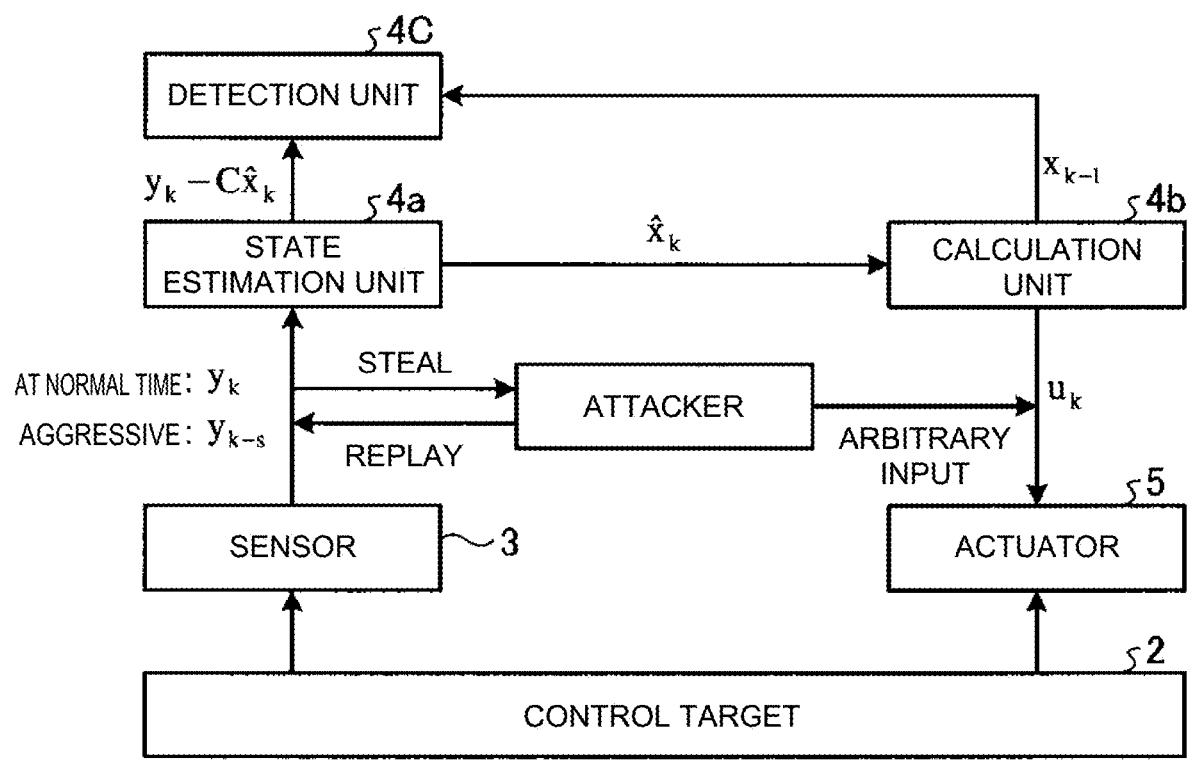
FIG. 2 is a diagram for explaining an attack by an attacker.
Figure 3:
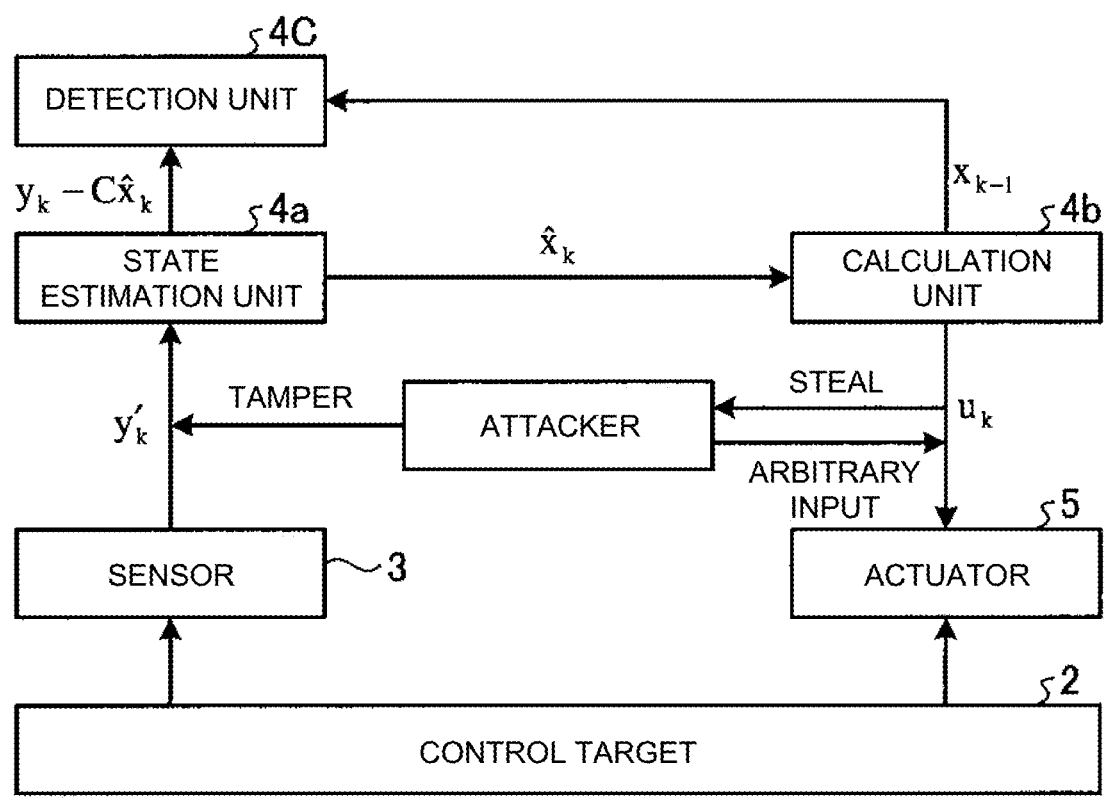
FIG. 3 is a diagram for explaining an attack by an attacker.

Here, FIGS. 2 and 3 are diagrams for explaining an attack by an attacker. First, in FIG. 2, a replay attack is illustrated. In the example shown in FIG. 2, an attacker steals sensor data $y_{k-s}$ in the past (k-s) and, at the time of attacking, performs a replay attack to tamper the sensor data $y_k$ to $y_{k-s}$. In this case, the detection unit 4c monitors presence/absence of abnormality by monitoring a difference between a value of the sensor data and an estimate of the sensor data calculated from an estimate of a state. Therefore, it is possible for the attacker to perform a replay attack to tamper the sensor data using the same sensor data as past sensor data so that the attack is not noticed by the controller 4.

Then, if the controller 4, that is, the state estimation unit 4a and the calculation unit 4b cannot detect the replay attack, it becomes possible for the attacker to make an arbitrary input to cause an illegal operation of the control target 2, to the actuator 5.

Therefore, in the conventional watermark method, it is possible for the calculation unit 4b to detect a replay attack by outputting a control input $u_k$ to which white noise is added, to the actuator 5 as shown by the following expression (5). In other words, by the noise being added, the same sensor data as past sensor data is not actually outputted, and, therefore, it becomes possible to detect a replay attack. Here, the white noise is noise according to normal distribution of mean 0, variance $\Xi$.

[Math. 5]

$$u_k = L\hat{x}_k + \underbrace{\xi_k, \xi_k \sim N(0, \Xi)}_{\text{WHITE NOISE}} \quad (5)$$

In FIG. 3, an attack by parameter identification is illustrated. In the example shown in FIG. 3, an attacker performs parameter identification of the control system by stealing a combination of the control input $u_k$ and the sensor data $y_k$.

For example, the attacker can identify the parameters A, B and C of the control system shown in the above expressions (1) to (3) using the PBSID method known as an algorithm capable of identifying parameters only by input/output data in a feedback control environment. The PBSID method is an algorithm to identify parameters A, B, C, D and K in an innovation form, indicated like the following expression (6).

[Math. 6]

$$\xi_{k+1} = A\xi_k + Bu_k + Ke_k, y_k = C\xi_k + Du_k + e_k \quad (6)$$

When the parameters are identified, it becomes possible for the attacker to calculate an estimate $y_k'$ of the sensor data $y_k$. Therefore, it becomes possible for the attacker to perform tampering of the sensor data $y_k$ at a higher accuracy than a replay attack and make an arbitrary input to cause an illegal operation of the control target 2 to the actuator 5.

Here, when white noise is added to a control input like the above expression (5), the control input has increased variation. Then, since the attacker can collect various combinations of the control input $u_k$ and the sensor data $y_k$, the order of a PE property, which is known as an identifiability index, becomes infinite. The PE property shows that, as the order is larger, more highly accurate identification is possible.

In comparison, if colored noise is added to a control input like the above expression (4), the order of the PE property is 2n relative to the number n of sine-wave frequencies ω included in the colored noise. Therefore, it is seen that, by selecting colored noise in a frequency band that influences the control system little, parameter identification of the control system becomes difficult.

Returning to the description of FIG. 1, the detection unit 4c detects an attack using past sensor data. For example, as shown in FIGS. 2 and 3, the detection unit 4c detects a replay attack by monitoring the difference between the value of the sensor data and the estimate of the sensor data calculated from the estimate of the state.

Specifically, as shown by Formula (7) below, the detection unit 4c performs a chi-square test of a freedom degree P, with a difference between the estimate of the sensor data and actual sensor data as a random variable. In other words, the detection unit 4c determines that there is a replay attack if a value of a statistic $g_k$ indicated by the following expression (7) exceeds a predetermined threshold.

[Math. 7]

$$g_k = \sum_{i=k-p+1}^{k} \frac{(y_i - C(A\hat{x}_k + Bu_K))^T \text{Cov}(x)^{-1}(y_i - C(A\hat{x}_k + Bu_K))}{\text{SQUARE OF DIFFERENCE BETWEEN ESTIMATE OF SENSOR DATA AND ACTUAL SENSOR DATA}} \quad (7)$$

Here, if there is not a replay attack, an expected value of the square of the random variable "the difference between the estimate of the sensor data and the actual sensor data" is indicated by the following expression (8).

[Math. 8]

$$\frac{E(y_i - C(A\hat{x}_k + Bu_K))^T \text{Cov}(x)^{-1}(y_i - C(A\hat{x}_k + Bu_K))}{\text{EXPECTED VALUE OF DIFFERENCE BETWEEN ESTIMATE OF SENSOR DATA AND ACTUAL SENSOR DATA}} = m \quad (8)$$

On the other hand, if there is a replay attack, the expected value of the square of the random variable "the difference between the estimate of the sensor data and the actual sensor data" is indicated by the following expressions (9) and (10).

[Math. 9]

$$\frac{E(y_i - C(A\hat{x}_k + Bu_K))^T \text{Cov}(x)^{-1}(y_i - C(A\hat{x}_k + Bu_K))}{\text{EXPECTED VALUE OF DIFFERENCE BETWEEN ESTIMATE OF SENSOR DATA AND ACTUAL SENSOR DATA}} = m + M \quad (9)$$

[Math. 10]

HERE, THE FOLLOWING IS *SATISFIED*: (10)

$$M = \sum_{i=1}^{n} \left( M_i^{(1)} M_i^{(2)} \exp(j2\pi\omega_i(k-1) + \theta_i))(\cdot)^T \right)$$
$$M_i^{(1)} = C(I - A\exp(-j2\pi\omega_i))^{-1} Ba_i$$
$$M_i^{(2)} = 1 - \exp(j2\pi\omega_i l)$$

When there is a replay attack, these values are larger by M than when there is not a replay attack. Therefore, if M is sufficiently large, it is possible to detect a replay attack. Therefore, in the detection system 1 of the present embodiment, by the calculation unit 4b selecting colored noise in a frequency band where $M^{(1)}$ is as large as possible, it becomes possible to improve replay attack detection performance. Thus, by the calculation unit 4b selecting a frequency band of colored noise using the predetermined index $M^{(1)}$, it becomes possible to improve the replay attack detection performance.

[Detection Process]

Figure 4:
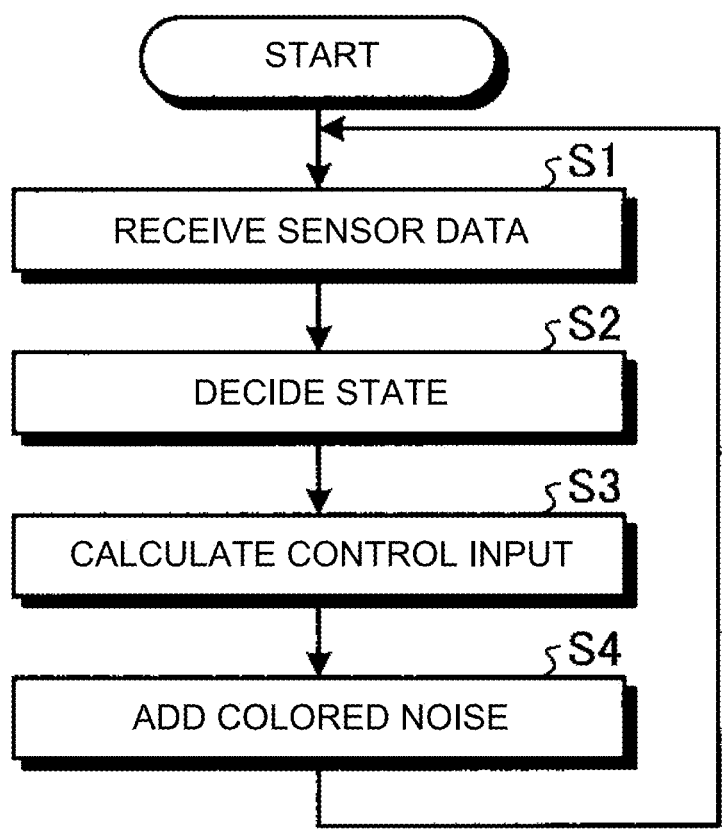
FIG. 4 is a flowchart showing a detection process procedure by the detection system according to the present embodiment.

FIG. 4 is a flowchart showing a detection process procedure by the detection system 1 according to the present embodiment. The flowchart in FIG. 4 is started, for example, at a timing when a user performs a start instruction operation on the controller 4.

First, the controller 4 receives sensor data obtained by the sensor 3 sensing physical information showing a state of the control target 2 (step S1). In the controller 4, the state estimation unit 4a calculates an estimate of the state of the control target 2 using sensor data yk outputted from the sensor 3 and a control input uk calculated by the calculation unit 4b (step S2).

The calculation unit 4b calculates a control input to perform optimal control according to the estimate of the state (step S3). Further, the calculation unit 4b adds colored noise with a frequency co within a predetermined range, to the control input to perform the optimal control (step S4).

Then, the calculation unit 4b outputs the control input to which the colored noise is added, to the actuator 5, returns the process to step S1 and waits for a response of sensor data outputted from the sensor 3.

As described above, in the detection system 1 of the present embodiment, the state estimation unit 4a of the controller 4 calculates an estimate of a state of the control target 2 using sensor data indicating the state of the control target 2 outputted from the sensor 3 and a control input to control the state of the control target 2. Further, the calculation unit 4b calculates a control input to which colored noise in a predetermined frequency band is added, according to the calculated estimate of the state of the control target 2.

Thereby, in the detection system 1 of the present embodiment, it becomes possible to easily make parameter identification of the control system by an attacker difficult and detect a replay attack, without changing a system configuration. Therefore, it becomes possible to prevent leakage of confidential information and an attack by higher-level tampering.

EXAMPLE

In the present example, parameter identification was performed using a control system that performs feedback control. This control system is identified by parameters indicated by the following expression (11). Here, Q and R indicate modeled noise w according to normal distribution and variance of environmental noise v, respectively.

[Math. 11]

$$A = \begin{pmatrix} 0.98 & 2 & 0.74 \\ 0 & -0.49 & 1 \\ 0 & -0.72 & -0.49 \end{pmatrix}, \quad (11)$$

$$B = \begin{pmatrix} 0 \\ 0 \\ 0.85 \end{pmatrix},$$

$$C = (0.57 \quad 0.72 \quad 0.27)$$

$$Q = 1, R = I$$

In this control system, parameter identification by an operation of 1000 steps at a time was performed N=100 times, using the conventional watermark method and the control input $u_k$ of the method proposed by the above embodiment. In the conventional watermark method, it was assumed that white noise was added to the control input $u_k$ as indicated by the following expression (12).

[Math. 12]

$$u_k = L\hat{x}_k + \xi_k, \xi_k \sim N(0,1) \quad (12)$$

Further, in the method proposed by the above embodiment, it was assumed that colored noise was added to the control input $u_k$ as indicated by the following expression (13).

[Math. 13]

$$u_k = L\hat{x}_k + \Sigma_{n=1} \alpha_n \sin(\omega_n k + \theta_n), \omega = 0.1, 0.11, \ldots, 0.2 \quad (13)$$

Figure 5:
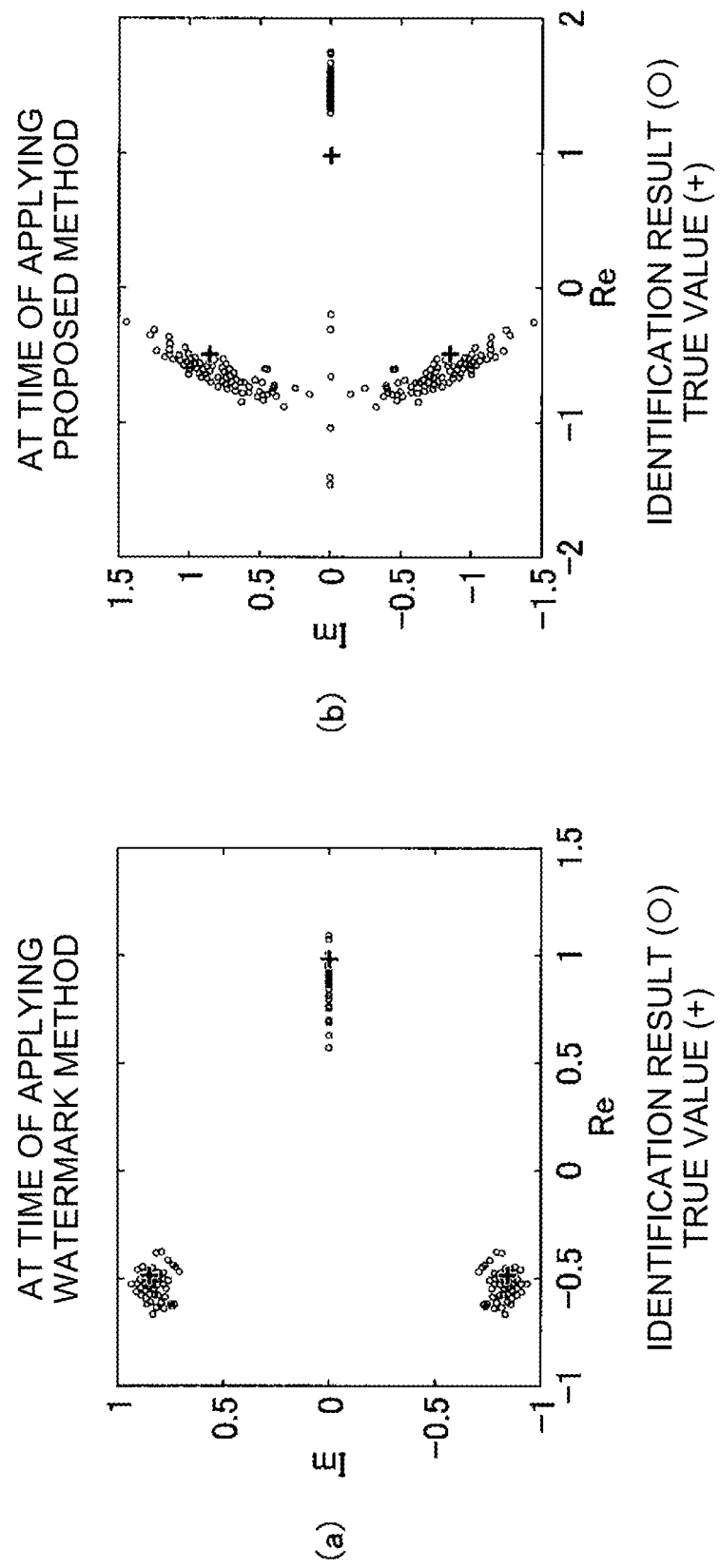
FIG. 5 is a diagram for explaining an example.
Figure 6:
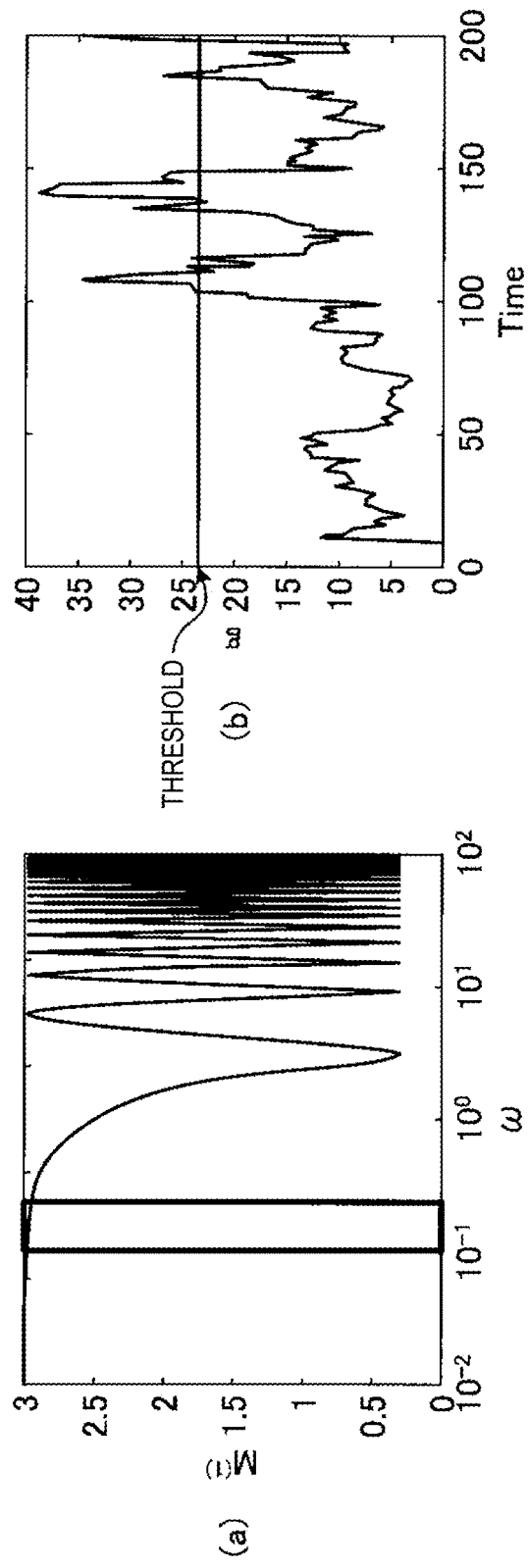
FIG. 6 is a diagram for explaining an example.

FIGS. 5 and 6 are diagrams for explaining the example. In FIG. 5, eigenvalues of parameters A and true values are plotted on polar coordinates. It is seen that, according to the conventional watermark method, identification results are close to the true values, and identification is accurately performed as shown in FIG. 5(a). On the other hand, it is seen that, according to the method proposed by the above embodiment, identification results are significantly apart from true values as shown in FIG. 5(b), and identification accuracy is low. Thus, it was confirmed that, according to the detection system 1 of the above embodiment, parameter identification is difficult.

Next, in FIG. 6, a replay attack detection result in the control system of the method proposed by the above embodiment is illustrated. Here, in FIG. 6(a), the relationship between $M^{(1)}$ and the frequency co shown by the above expression (10) is illustrated. As shown in FIG. 6(a), it is seen that $M^{(1)}$ is sufficiently large in a frequency band shown by being surrounded by a thick frame (w=0.1, 011, ..., 0.2).

Further, in FIG. 6(b), time-series change of the statistic $g_k$ (hereinafter written as g) shown by the above expression (7) in the case where the control input $u_k$ to which colored noise in the frequency band where $M^{(1)}$ is sufficiently large, which is shown in FIG. 6(a), is added as shown by the above expression (13) is illustrated. Here, a replay attack was started at time=100, and change of g was monitored. In this case, since the value of g significantly changes at and after the time=100 and exceeds a predetermined threshold as shown in FIG. 6(b), it can be determined that there is a replay attack at and after the time=100. Thus, it was confirmed that, according to the detection system 1 of the above embodiment, it is possible to detect a replay attack.

[Program]

It is also possible to create a program in which the processes to be executed by the detection system 1 according to the above embodiment are written in a computer-executable language. As one embodiment, the controller 4 of the detection system 1 can be implemented by causing a detection program to execute the above detection process to be installed into a desired computer as package software or online software. For example, it is possible to, by causing an information processing device to execute the above detection program, cause the information processing device to function as the controller 4. As the information processing device stated here, a desktop-type or laptop-type personal computer is included. In addition, as the information processing device, a mobile communication terminal such as a smartphone, a mobile phone and a PHS (personal handy-phone system) and, furthermore, a slate terminal such as a PDA (personal digital assistant) is included in the category. Further, the functions of the controller 4 may be implemented in a cloud server.

Figure 7:
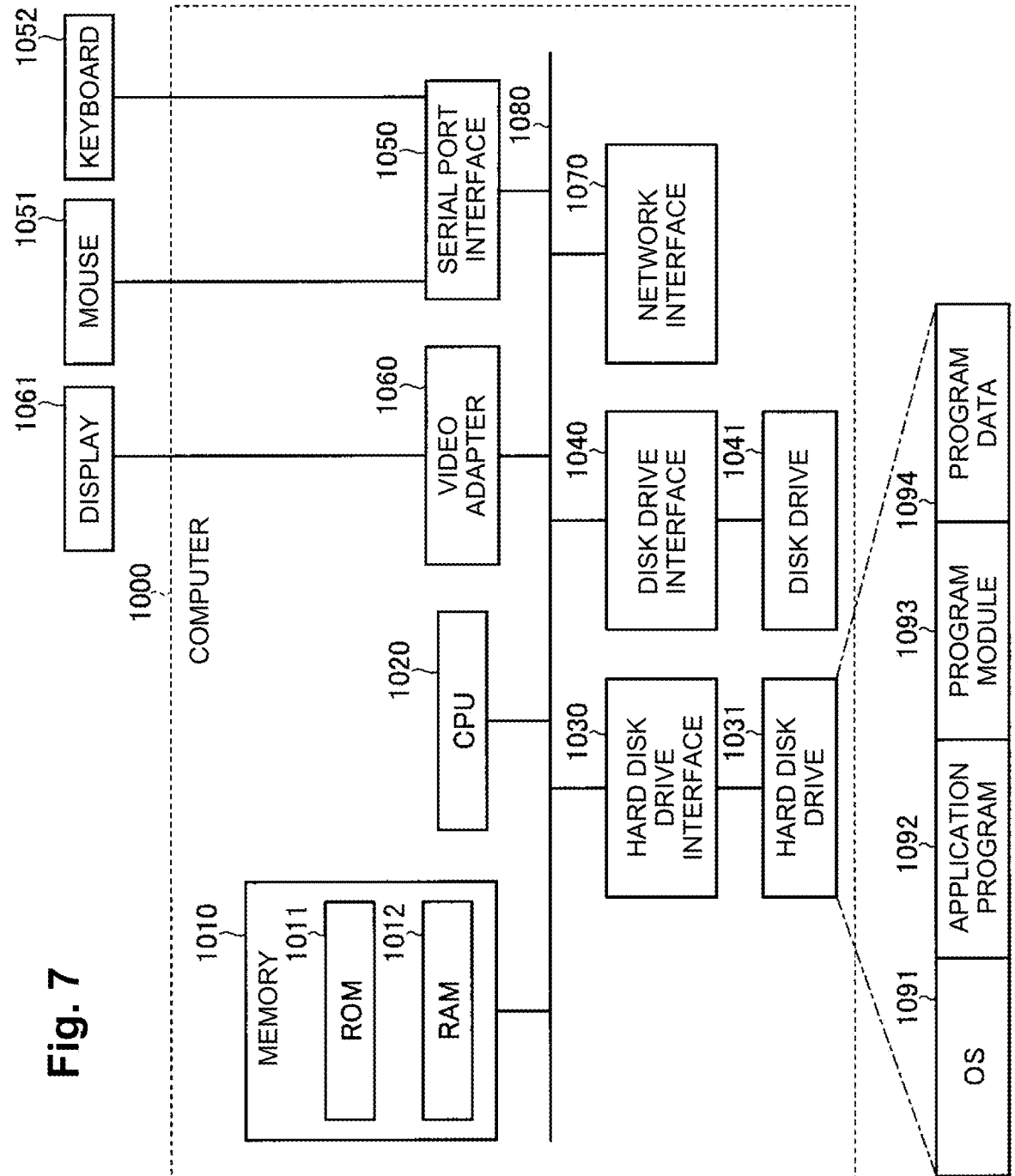
FIG. 7 is a diagram showing an example of a computer to execute a detection program.

FIG. 7 is a diagram showing an example of a computer to execute the detection program. A computer 1000 has, for example, a memory 1010, a CPU 1020, a hard disk drive interface 1030, a disk drive interface 1040, a serial port interface 1050, a video adapter 1060 and a network interface 1070. These units are connected via a bus 1080.

The memory 1010 includes a ROM (read-only memory) 1011 and a RAM 1012. The ROM 1011 stores, for example, a boot program such as BIOS (basic input/output system). The hard disk drive interface 1030 is connected to a hard disk drive 1031. The disk drive interface 1040 is connected to a disk drive 1041. For example, a removable storage medium such as a magnetic disk and an optical disk is inserted into the disk drive 1041. To the serial port interface 1050, for example, a mouse 1051 and a keyboard 1052 are connected. To the video adapter 1060, for example, a display 1061 is connected.

Here, the hard disk drive 1031 stores, for example, an OS 1091, an application program 1092, a program module 1093 and program data 1094. Each piece of information described in the above embodiment is stored, for example, in the hard disk drive 1031 or the memory 1010.

Further, the detection program is stored in the hard disk drive 1031, for example, as the program module 1093 in which commands to be executed by the computer 1000 are written. Specifically, the program module 1093 in which each process to be executed by the controller 4, which has been described in the above embodiment, is written is stored in the hard disk drive 1031.

Further, data used in information processing by the detection program is stored, for example, in the hard disk drive 1031 as the program data 1094. Then, the CPU 1020 reads the program module 1093 and the program data 1094 stored in the hard disk drive 1031 onto the RAM 1012 as necessary and executes each procedure described above.

The program module 1093 and the program data 1094 related to the detection program are not limited to the case of being stored in the hard disk drive 1031 but may be stored, for example, in a removable storage medium and read out by the CPU 1020 via the disk drive 1041 or the like. Or alternatively, the program module 1093 and the program data 1094 related to the detection program may be stored in another computer connected via a network such as a LAN and a WAN (wide area network) and read out by the CPU 1020 via the network interface 1070.

An embodiment to which an invention made by the inventor is applied has been described above. The present invention, however, is not limited by the description and drawings forming a part of disclosure of the present invention by the present embodiment. In other words, all of other embodiments, examples, operation techniques and the like made by those skilled in the art based on the present embodiment are included in the category of the present invention.

REFERENCE SIGNS LIST

1 Detection system
2 Control target
3 Sensor
4 Controller
4a State estimation unit
4b Calculation unit
4c Detection unit
5 Actuator

The invention claimed is:

1. A detection method executed in a detection system comprising a sensor and a controller, the detection method comprising:
    a state estimation process of the controller calculating, using sensor data indicating a state of a control target outputted from the sensor and a control input to control the state of the control target, an estimate of the state of the control target;
    a calculation process of the controller calculating the control input to which colored noise in a predetermined frequency band is added, according to the estimate of the state of the control target which has been calculated; and
    responsive to the state estimate process and the calculation process, detecting an attack using past sensor data when a difference between the estimate of the state of the control target and an output of the calculation process exceeds a predetermined threshold.

2. The detection method according to claim 1, further comprising:
    selecting, in the calculation process, the predetermined frequency band using a predetermined index.

3. A detection system comprising:
    a sensor; and
    a controller which includes:
        state estimation circuitry configured to calculate, using sensor data indicating a state of a control target outputted from the sensor and a control input to control the state of the control target, an estimate of the state of the control target;
        calculation circuitry configured to calculate the control input to which colored noise in a predetermined frequency band is added, according to the estimate of the state of the control target which has been calculated; and
        detection circuitry configured to detect an attack using outputs from the state estimation circuitry and the calculation circuitry when a difference between the estimate of the state of the control target and an output of the calculation circuitry exceeds a predetermined threshold.

4. A non-transitory computer readable medium including instructions, which when executed, cause a computer to execute:
    calculating, using sensor data indicating a state of a control target outputted from the sensor and a control input to control the state of the control target, an estimate of the state of the control target;
    calculating the control input to which colored noise in a predetermined frequency band is added, according to the estimate of the state of the control target which has been calculated; and
    responsive to the calculating the estimate and the calculating the control input, detecting an attack when a difference between the estimate of the state of the control target and an output of the calculating the control input exceeds a predetermined threshold.

5. The detection method according to claim 1, further comprising:
    controlling an actuator when the attack is detected.

6. The detection system of claim 3, further comprising:
    an actuator which is controlled in response to a detection, by the detection circuitry, of the attack.

7. The non-transitory computer readable medium according to claim 4, which further includes instructions which further cause the computer to execute:
    controlling an actuator when the attack is detected.

* * * * *